United States Patent Office 3,597,461
Patented Aug. 3, 1971

3,597,461
HYDRIDE AND CARBONYL TRIPHENYLPHOSPHINE DERIVATIVES OF RUTHENIUM AND OSMIUM
Francois L'Eplattenier and Fausto Calderazzo, Geneva, Switzerland, assignors to American Cyanamid Company, Stamford, Conn.
No Drawing. Filed Aug. 13, 1968, Ser. No. 752,159
Int. Cl. C07f 15/00; C01g 55/00; B01j 1/10
U.S. Cl. 260—429                4 Claims

ABSTRACT OF THE DISCLOSURE

Pentacoordinate complexes of ruthenium and osmium of the general formula $$M(CO)_{5-n}[P(C_6H_5)_3]_n$$

M=Ru, Os,
n=1,2,
are prepared by reacting the corresponding pentacarbonyls with triphenylphosphine. Also dihydrido compounds of formula $MH_2(CO)_2[P(C_6H_5)_3]_2$ (M=Ru, Os) are described. These dihydrido derivatives can be produced by reacting the corresponding tricarbonylbis (triphenylphosphine) compounds, $M(CO)_3[P(C_6H_5)_3]_2$, with hydrogen. Also the preparation of $OsH_2(CO)_3P(C_6H_5)_3$ from $Os(CO)_4P(C_6H_5)_3$ and hydrogen is disclosed in the present invention. The tetracarbonyl compounds $$M(CO)_4P(C_6H_5)_3$$

and the dihydrido compounds $$MH_2(CO)_2[P(C_6H_5)_3]_2$$

are new chemical compounds. The compounds have utility as hydrogenation catalysts.

BACKGROUND OF THE INVENTION

Bis(triphenylphosphine)tricarbonyls of osmium and ruthenium have been prepared, but not by reaction of the corresponding pentacarbonyls with triphenylphosphine; a process involving zinc reduction in the presence of carbon monoxide was the method used.

SUMMARY OF THE INVENTION

The present invention has two aspects, one is a process aspect in which pentacarbonyls of osmium or ruthenium are reacted with triphenylphosphine. Tetracarbonyls and tricarbonyls can be produced depending on the amount of triphenylphosphine used. Another process included is the reaction of the bis(triphenylphosphine) tricarbonyl osmium and ruthenium with hydrogen at elevated temperature and pressure to produce dihydridodicarbonyl compounds. A still further process included is the reaction of $Os(CO)_4P(C_6H_5)_3$ and hydrogen at elevated temperature and pressure to produce the compound, $$OsH_2(CO)_3P(C_6H_5)_3$$

The above processes are carried out in the presence of an anhydrous organic solvent. A second aspect of the invention is that some of the compounds produced, namely the tetracarbonyl compounds $(M(CO)_4P(C_6H_5)_3$ and the dihydrido compounds, $MH_2(CO)_2(P(C_6H_5)_3)_2$, are new chemical compounds.

The compounds can be used as hydrogenation catalysts, particularly the tetracarbonyl compounds.

It is an advantage of the invention that the reaction with the pentacarbonyls can take place a about room temperautre and does not require special high temperatures or pressures. On the other hand, higher temperatures up to about 130° C. may be used in closed systems and give bis-(triphenylphosphine)tricarbonyl osmium and ruthenium. The processes proceed readily and good yields are obtained. In general, the compounds produced are fairly stable to air but it is preferred to avoid contamination by excluding oxygen, for example by operating in an atmosphere of nitrogen. This modification of the process is preferred.

The new tetracarbonyl osmium and ruthenium appear to be present in a trigonal bypyramidal structure with the triphenylphosphine group in the axial position. This is indicated by infrared examination, which shows three active C—O stretching vibrations.

The dihydrido compounds show two metalhydrogen stretching vibrations, and nuclear magnetic resonance examinations indicate upfield triplet, suggesting that the two equivalent hydrogens are split by the two phosphorus nuclei of spin $I=\frac{1}{2}$. This together with the observation of two equally intense C—O stretching vibrations indicate that the structure is probably

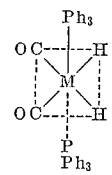

in which M is osmium or ruthenium.

The following table indicates the analytical data obtained:

| | C percent | | H percent | | P percent | | NMR | | |
|---|---|---|---|---|---|---|---|---|---|
| | Calc'd | Found | Found | Found | Calc'd | Found | Chem. shift | Multiplicity | J(c/s) |
| Compound: | | | | | | | | | |
| $Ru(CO)_4P(C_6H_5)_3$ | 55.58 | 55.72 | 3.18 | 3.30 | 6.51 | 6.31 | | | |
| $Ru(CO)_3(P(C_6H_5)_3)_2$ | 66.01 | 65.38 | 4.26 | 4.39 | | | | | |
| $RuH_2(CO)_2(P(C_6H_5)_3)_2$ | 66.76 | 66.53 | 4.72 | 4.84 | 9.06 | 8.84 | 16.90 | Triplet | 23 |
| $Os(CO)_4 P(C_6H_5)_3$ | 46.81 | 47.03 | 2.68 | 2.87 | 5.49 | 5.26 | | | |
| $Os(CO)_3(P(C_6H_5)_3)_2$ | 58.64 | 58.88 | 3.79 | 3.96 | 7.75 | 7.52 | | | |
| $OsH_2(CO)_2(P(C_6H_5)_3)_2$ | 59.06 | 59.01 | 4.17 | 4.35 | 8.02 | 8.14 | 17.65 | Triplet | 23 |
| | | 59.23 | | 4.01 | | 7.88 | | | |

INFRARED DATA

| Compound: | $\nu_{c-o}$ (cm.$^{-1}$) | $\nu_{M-H}$ (cm.$^{-1}$) | $\nu_{M-D}$ (cm.$^{-1}$) | Medium |
|---|---|---|---|---|
| Ru(CO)$_4$P(C$_6$H$_5$)$_3$ | 2,060vs, 1,986m, 1953 | | | Heptane. |
| Ru(CO)$_3$P(C$_6$H$_5$)$_3$)$_2$ | 1,900 | | | THF. |
| RuH$_2$(CO)$_2$(P(C$_6$H$_5$)$_3$)$_2$ | 2,011vs, 1,974vs | 1,878m, 1,823m | | Halocarbon. |
| RuD$_2$(CO)$_2$(P(C$_6$H$_5$)$_3$)$_2$ | 2,004, 1,950 | | 1,360, 1,321 | Do. |
| Os(CO)$_4$P(C$_6$H$_5$)$_3$ | 2,060s, 1,980m, 1,943vs | | | Heptane. |
| Os(CO)$_3$(P(C$_6$H$_5$)$_3$)$_2$ | 1,890 | | | THF. |
| OsH$_2$(CO)$_3$P(C$_6$H$_5$)$_3$ | {2,079vs, 2,027s, 2,018vs  1,959w, 1,922w<br>  2,075vs, 2,029s, 2,005vs. 1,923m. 1,955m, | | | Heptane.<br>Halocarbon |
| OsH$_2$(CO)$_2$(P(C$_6$H$_5$)$_3$)$_2$ | 2,014vs, 1,990vs | 1,928m, 1,873m | | Do. |

Note.—As is usual, tetrahydrofuran is abbreviated THF.

DESCRIPTION OF THE PREFERRED EMBODIMENTS

The invention will be described in greater detail in conjunction with the following specific examples in which the parts are by weight unless otherwise specified.

EXAMPLE 1

A ruthenium pentacarbonyl solution in tetrahydrofuran, which will be abbreviated THF throughout the specification, was prepared as described in the article by the applicants in Inorganic Chemistry, vol. 6, p. 1220. One equivalent of triphenylphosphine was then added and the reaction mixture irradiated at room temperature with ultraviolet light. As in all of the examples, the reaction mixture was protected from oxygen by nitrogen atmosphere. The reaction was practically complete after about three hours. Very small amounts of bis(triphenylphosphine) tricarbonylruthenium were found. The yield approached the quantitative.

The crude product obtained was then purified by chromatography on silica gel. Elution was with heptane-THF (10:1), under nitrogen and with the exclusion of light. From the eluate colorless crystals of the monosubstituted product Ru(CO)$_4$P(C$_6$H$_5$)$_3$ were obtained. The compound is somewhat sensitive to daylight, and under daylight it tends to become yellow. Decomposition of the tetracarbonylmonosubstituted compound occurs at about 130° C.

EXAMPLE 2

The procedure of Example 1 was repeated, substituting the pentacarbonyl of osmium for that of ruthenium. The reaction was much slower, and after 12 hours of irradiation the conversion was about 50%. As in Example 1, there were small amounts of the corresponding bis(triphenylphosphine)tricarbonylosmium. Unreacted pentacarbonyl was distilled off.

The crude product obtained was purified chromatographically as described for the corresponding ruthenium compound in Example 1. Its physical properties of this compound analyzing correctly for Os(CO)$_4$P(C$_6$H$_5$)$_3$ decomposition at a higher temperature, 186° C.

EXAMPLE 3

The procedure of Example 1 was repeated with 2 equivalents of triphenylphosphine, the reaction being carried out at 130° C. in an autoclave in THF. After about 3 hours almost complete conversion to bis(triphenylphosphine)-tricarbonylruthenium resulted. The crude product was recrystallized from a 1:1 mixture of heptane and THF. The compound was pale yellow, practically insoluble in heptane and slightly soluble in THF.

EXAMPLE 4

The procedure of Example 3 was repeated, substituting the pentacarbonyl of osmium for that of ruthenium. The reaction went to completion quite rapidly, and on purification as described in Example 3, the pale yellow compound was obtained which had the same solubility characteristics as the corresponding ruthenium compound.

EXAMPLE 5

A solution of the product of Example 2 in THF was reacted with hydrogen at 120 atmospheres at 130° C. After 3 hours the reaction was practically complete, no starting material being detectable by infrared spectrum analysis. The solvent was evaporated and the crude material recrystallized from a 1:1 heptane-THF solution. It had the formula OsH$_2$(CO)$_3$P(C$_6$H$_5$)$_3$.

EXAMPLE 6

The procedure of Example 5 was repeated, replacing the triphenylphosphinetetracarbonylosmium with the corresponding bis(triphenylphosphine) tricarbonylosmium. After about 12 hours approximately 50% of the starting materials were converted into the dihydro compound OsH$_2$(CO)$_2$(P(C$_6$H$_5$)$_3$)$_2$. After recrystallization from a heptane-THF mixture, the colorless compound was obtained. It is insoluble in heptane and slightly soluble in THF.

Repeating this same procedure with deuterium instead of hydrogen resulted in the corresponding deuterium compound. The product was not 100% pure, small amount of the starting material being present.

EXAMPLE 7

The procedure of Example 6 was repeated, replacing the osmium compound with the corresponding ruthenium compound. The product obtained had the formula RuH$_2$(CO)$_2$(P(C$_6$H$_5$)$_3$)$_2$. Physical properties, including color and solubility, were similar to those of the osmium compound.

The reaction carried out with deuterium instead of hydrogen resulted in a deuterated product which was contaminated with some of the starting material.

We claim:
1. A process of producing triphenylphosphinetricarbonyldihydroosmium which comprises reacting a solution of triphenylphosphinetetracarbonylosmium in anhydrous organic solvent with hydrogen at high pressure and elevated temperatures.

2. A process of producing a compound of the formula MH$_2$(CO)$_2$[P(C$_6$H$_5$)$_3$]$_2$, in which M is selected from the group consisting of osmium and ruthenium, which comprises reacting a solution of the compound,

in anhydrous organic solvent with hydrogen at high pressure and elevated temperatures.

3. A compound having the formula

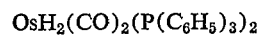

4. A compound having the formula $$RuH_2(CO)_2(P(C_6H_5)_3)_2$$

References Cited

Lewis et al.: Chem. and Ind. (London), 1963, pp. 1398–9.

Candlin et al.: Chem. and Ind. (London), 1966, pp. 1960–1.

Calderazzo et al.: Inorg. Chem. 6 (1967), p. 1220–4.

Manuel: Advances in Organometallic Chemistry; #3 (1965), Academic Press, New York, N.Y., pp. 224–5, pp. 235–6.

TOBIAS E. LEVOW, Primary Examiner

A. P. DEMERS, Assistant Examiner

U.S. Cl. X.R.

23—203; 204—157.1, 158; 252—431